UNITED STATES PATENT OFFICE.

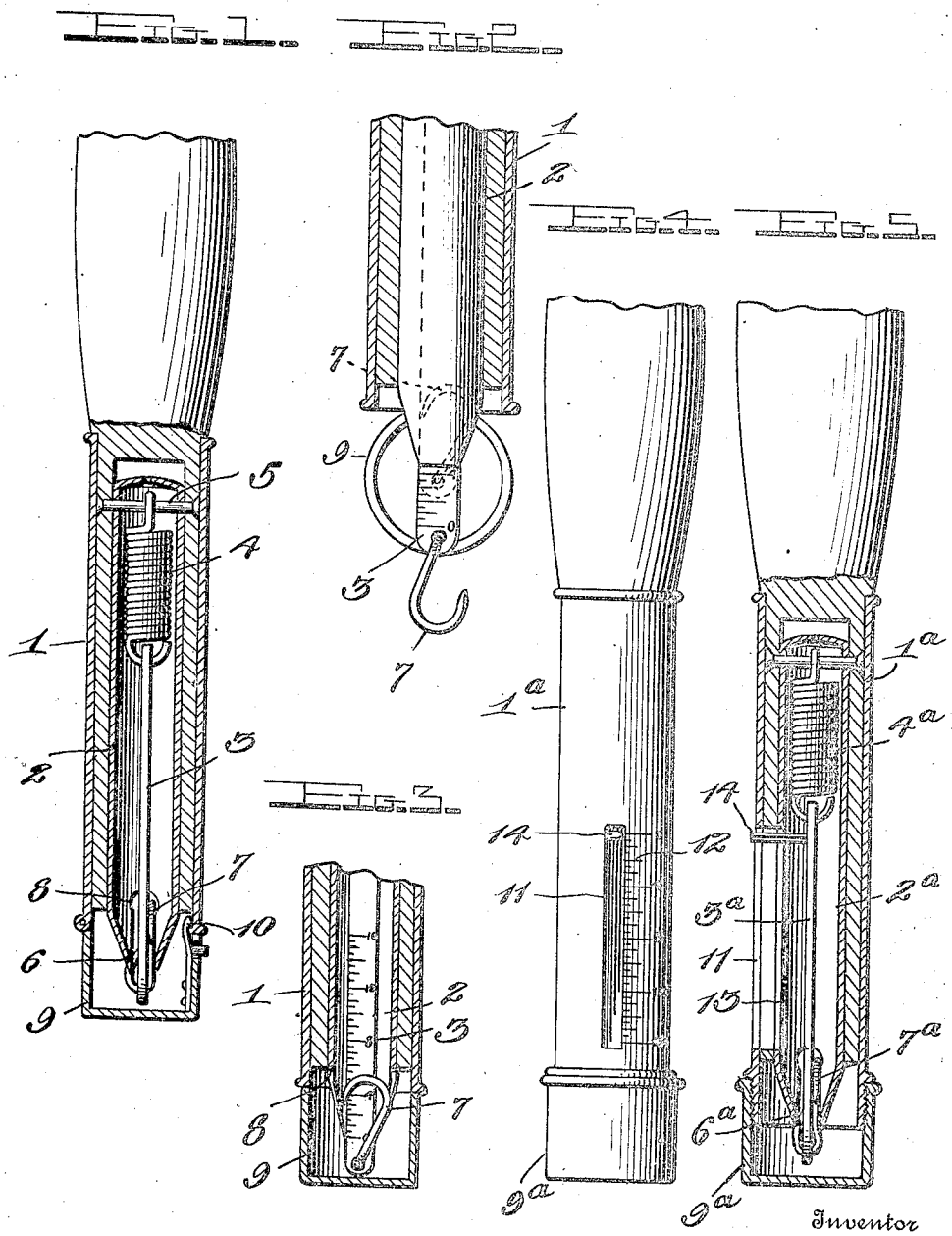

CHARLES E. DENNISON, OF SPOKANE, WASHINGTON.

WEIGHING DEVICE.

1,031,917.  Specification of Letters Patent.  Patented July 9, 1912.

Application filed February 12, 1912. Serial No. 676,944.

*To all whom it may concern:*

Be it known that I, CHARLES E. DENNISON, a citizen of the United States, residing at Spokane, in the county of Spokane and State of Washington, have invented certain new and useful Improvements in Weighing Devices, of which the following is a specification, reference being had to the accompanying drawings.

This invention comprehends certain new and useful improvements in weighing devices and has for its primary object a simple and efficient construction of spring balance or weighing attachment which may be easily incorporated in the reel seat of a fishing rod, whereby the fisherman may always have at hand means for weighing the catch.

The invention also has for its object a combined fishing rod, reel seat and weighing device, whereby the parts of the weighing device may be easily and cheaply manufactured and readily assembled and secured in proper position, relative to the handle or butt of the fishing pole, the device embodying a suspension hook which is pivotally connected to the suspension or draw bar of the weighing device and which is arranged to be positively housed in the tubular casing of said draw bar when the device is not required for use. And the invention also aims to generally improve this class of devices and to render them more useful and commercially desirable.

With these and other objects in view, as will more fully appear as the description proceeds, the invention consists in certain constructions, arrangements and combinations of the parts that I shall hereinafter fully describe and claim:

For a full understanding of the invention, reference is to be had to the following description and accompanying drawing in which, Figure 1 is a longitudinal sectional view of one form or embodiment of my invention. Fig. 2 is a sectional side elevation thereof. Fig. 3 is a fragmentary sectional view taken on a plane at right angles to Fig. 1. Fig. 4 is a side elevation of another embodiment of the device, and, Fig. 5 is a longitudinal section thereof.

Corresponding and like parts are referred to in the following description and designated in the accompanying drawing by like reference characters.

In that embodiment of my invention illustrated in Fig. 1, the reference numeral 1 designates a reel seat which is designed to accommodate a tubular casing 2, the casing being held within the reel seat in any desired way. Within the tubular casing 2, a preferably flat draw bar 3 is mounted, said draw bar displaying graduations, as shown, and being secured at one end to a coiled contractile spring 4. To secure the spring in place within the tubular casing 2, a pin 5 is fastened in the inner end of the casing, the spring being attached at one end to said pin, as clearly illustrated in Fig. 1.

The outer end of the tubular casing 2 is formed with a transversely opening and longitudinally extending slot 6 which is preferably formed by dividing or splitting this end of the casing and then bending together the two parts thus formed, whereby to form a contracted opening in which the outer end of the draw bar moves and is guided. A pivoted suspension hook 7 is secured to the outer end of the draw bar 3, for convenient engagement with the fish or other articles to be weighed, said hook, when in an inoperative position, having its bill inserted into the enlarged inner end 8 of the opening 6.

From as much of the description as has preceded in connection with the correlated views of the accompanying drawing, it will be understood that when the weighing attachment is not required for use, the hook 7 will be swung inwardly into the opening 6, its bill being received in the enlarged inner end 8 thereof and the entire device being securely housed within the reel seat 1, a hinged cap 9, with which the reel seat is provided, being closed over the outer end of the weighing attachment and being held in closed position by a catch spring 10 or the like. In order to use the device, it is only necessary to swing the cap 9 open and to disengage the bill of the hook 7 from the opening 6, whereupon the hook may be engaged with the fish by penetrating the gill and the weight of the fish immediately and accurately determined.

It is to be understood that my invention is not limited to that form or embodiment thereof illustrated in Fig. 1, but that various changes may be made in the construction, arrangement and proportions of the parts without departing from the scope of the invention, as defined in the appended claims. For example, reference is to be had to Fig. 5 wherein 1ª designates the reel seat, the same in this embodiment of the invention being formed with a longitudinally extending opening 11, on one side of which are displayed the graduations 12. Within the reel seat 1ª, is a tubular casing 2ª which is formed at one end with an opening 6ª corresponding to the opening 6 before described, said casing being formed with a longitudinal opening 13 registering with the slot 11 of the reel seat 1ª. The draw bar 3ª of this form of the device carries at one end, the pivoted hook 7ª and is secured at its opposite end to the contractile spring 4ª which is secured in place like the spring 4, as hereinbefore described. The draw bar 3ª is formed with a laterally projecting pin 14 which is adapted to extend out through the registering openings or slots 11 and 13, whereby the position of the draw bar will determine the weight imposed thereon. If desired, the device may include a screw cap 9ª, instead of the hinged cap 9, said cap screwing on the outer end of the reel seat 1ª so as to properly house and protect the parts of the scale when the same is not required for use. As the operation of this form of the device is substantially like that first herein described, with the exception of the pin or pointer 14, which passes out through the slots 11 and 13 of the reel seat and tubular casing mounted therein, further detailed description of the operation is deemed unnecessary.

What I claim is:—

1. In a device of the character described, a tubular casing, means for housing said casing, and a spring retracted draw bar mounted in said casing and provided at one end with a suspension hook, the casing being formed at its outer end with a transversely opening and longitudinally extending recess which is enlarged at its inner end, the recess being designed to guide the draw bar in its movement and the inner end of the recess being adapted to receive the bill of the suspension hook in the inoperative position of the latter.

2. A device of the character described, including a tubular casing provided at one end with a longitudinal recess dividing it into two sections, said sections being contracted toward each other to provide a guiding opening, a flat draw bar movable in the casing and guided in said opening, the inner end of the opening being enlarged, a suspension hook carried by the draw bar and pivotally connected thereto, the inner enlarged end of the opening being adapted to receive the bill of the suspension hook in the inoperative position of the latter, a contractile spring secured to the draw bar, and means for retaining the contractile spring within the casing.

3. A device of the character described, including in combination with a reel seat, a tubular casing mounted therein, said casing being formed at one end with an opening, the inner end of which is enlarged, a flat draw bar mounted in said casing and movable out through said opening and guided thereby, a pivoted suspension hook secured to the outer end of said draw bar, a spring connected to the inner end of the draw bar, a pin secured in the inner end of the casing and connected to the inner end of the spring, the bill of the hook being adapted to be received in the enlarged inner end of the opening of the casing, and a cap adapted to close over the end of the reel seat to inclose the parts when in an inoperative position.

In testimony whereof I hereunto affix my signature in the presence of two witnesses.

CHARLES E. DENNISON.

Witnesses:
 ROBT. L. HUDSON,
 G. T. MORK.